(12) United States Patent
Wright (10) Patent No.: US 9,809,070 B1
(45) Date of Patent: Nov. 7, 2017

(54) DROP HITCH APPARATUS AND METHOD FOR USING SAME

(71) Applicant: Thomas Wright, Marvell, AR (US)

(72) Inventor: Thomas Wright, Marvell, AR (US)

( * ) Notice: Subject to any disclaimer, the term of this patent is extended or adjusted under 35 U.S.C. 154(b) by 0 days.

(21) Appl. No.: 15/406,934

(22) Filed: Jan. 16, 2017

(51) Int. Cl.
*B60D 1/00* (2006.01)
*B60D 1/52* (2006.01)
*B60D 1/06* (2006.01)

(52) U.S. Cl.
CPC . *B60D 1/52* (2013.01); *B60D 1/06* (2013.01)

(58) Field of Classification Search
CPC ........................................................ B60D 1/52
USPC .................................. 280/491.1, 491.5, 515
See application file for complete search history.

(56) References Cited

U.S. PATENT DOCUMENTS

| | | | |
|---|---|---|---|
| 4,204,702 A * | 5/1980 | Oltrogge | B60D 1/075 280/491.5 |
| 4,280,713 A | 7/1981 | Bruhn | |
| 5,193,838 A | 3/1993 | Olson | |
| 5,286,050 A | 2/1994 | Stallings, Jr. et al. | |
| 6,575,488 B2 | 6/2003 | Massey | |
| 6,824,156 B2 | 11/2004 | Smith | |
| 7,451,996 B2 | 11/2008 | Miles et al. | |
| 8,033,563 B2 | 10/2011 | Good | |
| 9,272,592 B1 * | 3/2016 | Kringstad | B60D 1/565 280/491.5 |
| 2003/0201622 A1 * | 10/2003 | Westerdale | B60D 1/52 280/495 |
| 2012/0056448 A1 * | 3/2012 | Takahashi | B60D 1/06 296/203.04 |

* cited by examiner

*Primary Examiner* — Tony Winner
(74) *Attorney, Agent, or Firm* — Rashauna Norment (57) ABSTRACT

An improved drop hitch apparatus has at least one hitch plate for coupling to a portion of a hitch assembly of a trailer, a support assembly for supporting the hitch assemblies of a trailer and a towing vehicle, and a mounting assembly for mounting the apparatus to at least a portion of a hitch assembly of a towing vehicle. The drop hitch apparatus is useful as a height adjustment adapter to couple a trailer and a towing vehicle when the trailer has a hitch assembly lower than that of the towing vehicle's hitch assembly. The mounting assembly has a mounting shelf, a mounting bar, a stability member. The support assembly has an upstanding support plate and an upstanding shaft member.

18 Claims, 7 Drawing Sheets

DROP HITCH APPARATUS AND METHOD FOR USING SAME

CROSS-REFERENCE TO RELATED APPLICATIONS

Not applicable.

FEDERALLY SPONSORED RESEARCH AND DEVELOPMENT

Not applicable.

BACKGROUND OF THE INVENTION

1. Field of the Invention

The present invention generally relates to a drop hitch apparatus. More particularly, the invention relates to a drop hitch apparatus used as an adapter for coupling a towing vehicle to a trailer, wherein the trailer has a hitching assembly that is lower than the hitching assembly of the towing vehicle.

2. Description of Arguably Related Art Including Information Disclosed for 37 CFR 1.97 and 1.98

People have been towing and hauling trailers behind or with towing vehicles for years. Towing vehicles may be motorized vehicles or non-motorized vehicles (collectively, a "towing vehicle"). Motorized vehicles include, but are not limited to, cars, trucks, vans, tractors, farming and logging vehicles. Trailers being pulled by the towing vehicle include, but are not limited to, non-motorized vehicles, motorized vehicles, and other hauling implements (collectively, a "trailer"). The towing vehicle and the trailer each include a hitch assembly that is positioned, mounted or otherwise affixed to or at the towing vehicle or the trailer, respectively. Alternatively, the hitch assembly may be integrally part of the towing vehicle or the trailer. Further still the trailer may be a separate frame or bed with its own hitch member or hitch assembly and a wheel(s), with the item to be transported being placed, connected, or positioned on or to the trailer bed. Here, this version of the trailer hitch assembly is coupled to the towing vehicle hitch assembly. At least a portion of the towing vehicle hitch assembly removably attaches to the corresponding portion of the trailer hitch assembly. Therefore, the hitch assembly essentially has a first hitch member on or at the towing vehicle and a corresponding second hitch member on or at the trailer.

Problems exist when using traditional and conventional hitch assemblies to connect a towing vehicle to a trailer when the trailer hitch member is substantially lower than the towing vehicle hitch member. In this situation, in order to couple the trailer to the towing vehicle, the trailer would need to be substantially raised, lowered, or tilted so that the trailer hitch member can properly fit onto the corresponding towing vehicle hitch member. Tilting or raising the trailer to accommodate for the height discrepancy of the respective hitch assemblies will result in additional wear and tear on the towing vehicle and on the trailer. This tilting may also result in unsafe driving and towing conditions. To solve this problem, some hitch assemblies include height adjustment adapters, such as drop hitches. However, problems still remain with these drop hitches. Some drop hitches are time consuming to install and adjust, or do not properly fit or adapt to the hitch assemblies of the towing vehicle and the trailer. Some drop hitches are expensive to manufacture and therefore, those costs pass on to the consumer. Other drop hitches require modification to the towing vehicle, the trailer, or both. This modification is problematic because permanent modification to the towing vehicle or trailer may void its warranty.

U.S. Pat. No. 4,280,713 issued to Bruhn discloses a trailer hitch that has a first body member arranged and secured on a vehicle, with the first body member having an outwardly facing socket, a second body member having an inwardly facing socket, and a connecting neck having opposite ends for inserting into the respective sockets. The neck has a vertical body portion and extending ends to provide a drop hitch. The hitch also includes a mounting plate for mounting the first body member to the bumper with bolts. A lock pin with a removable fastener holds the pin in place on the body member. U.S. Pat. No. 7,451,996 issued to Miles et al. discloses a universal adjustable lift or drop hitch that has a vertically adjustable bar secured within a mounting sleeve, a spring, and a pin. The vertical bars have a plurality of holes for receiving the pin.

None of the references disclose an improved drop hitch apparatus that has at least one hitch plate for coupling to a portion of a hitch assembly of a trailer and for use as a height adjustment adapter when the trailer hitch assembly is lower than a towing vehicle hitch assembly; a mounting assembly having a mounting shelf, a mounting bar, and a J-hook fastener for mounting the apparatus to at least a portion of a hitch assembly of the towing vehicle; and a support assembly having an upstanding support plate connected to the hitch plate, and a shaft member connecting to the hitch plate and the mounting assembly, with the support assembly for supporting the trailer and the towing vehicle.

A need exists for an improved drop hitch apparatus used as a height adjustment adapter to couple a towing vehicle to a trailer when the trailer has a hitch assembly lower than the hitch assembly of the towing vehicle.

A need exists for an improved drop hitch apparatus that is easy to manufacture, install, and use.

A need exists for an improved drop hitch apparatus that can be installed for use with a variety of towing vehicles and trailers.

A need exists for an improved drop hitch apparatus for use with the existing hitching assembly or equipment of a towing vehicle and a trailer.

SUMMARY OF THE INVENTION

In an embodiment, the invention is a drop hitch apparatus comprising (including or having):

(a) at least one hitch plate for removably coupling to at least a portion of a hitch assembly of a trailer;

(b) a mounting assembly comprising a mounting shelf and a stability member fastenable to the mounting shelf the mounting assembly removably coupling to or mountable to a towing vehicle hitch assembly; and (c) a support assembly for supporting the hitch plate and the mounting assembly, the support assembly comprising an upstanding shaft member removably coupling to or mountable to a towing vehicle hitch assembly.

The drop hitch apparatus is essentially a height adjustment adapter that is installed on or to an existing first hitch member of a towing vehicle and that is coupled to a trailer's corresponding second hitch member. This drop hitch apparatus is used to bridge the gap between the towing vehicle and the trailer when the trailer's hitch assembly, namely, its hitch member, is lower than the towing vehicle's hitch assembly. The structure and arrangement of the drop hitch apparatus provides stability and strength to the hitch assembly. The mounting assembly is supported by the support assembly and at least a portion of the towing vehicle hitch assembly. The hitch plate is connected to or otherwise extends outwardly from the support assembly. The apparatus can be attached to the towing vehicle and the trailer in approximately five minutes using a combination wrench, preferably a 1⅛ inch combination wrench, and four threaded hex head bolts.

It is an object of the invention to provide an improved drop hitch apparatus used as a height adjustment adapter to couple a towing vehicle to a trailer when the trailer has a hitch assembly lower than the hitch assembly of the towing vehicle.

It is an object of the invention to provide an improved drop hitch apparatus that is easy to manufacture, install, and use.

It is another object of the invention to provide an improved drop hitch apparatus that can be installed quickly with a single wrench.

It is yet another object of the invention to provide an improved drop hitch apparatus that can be installed for use with a variety of towing vehicles and trailers.

It is an object of the invention to provide an improved drop hitch apparatus for use with the existing hitching assembly or equipment of a towing vehicle and a trailer.

These and other aspects, objects, embodiments, and advantages of the invention will become apparent from the accompanying drawing and the following detailed description of the preferred embodiments of the invention.

BRIEF DESCRIPTION OF THE SEVERAL VIEWS OF THE DRAWING

The invention may be more readily described by reference to the accompanying drawing figures and the following description of the drawing figures. The reference numbers apply to each embodiment of the invention. In the drawing.

The broken lines in the drawing for the towing vehicle and the trailer are for illustrative purposes only and form no part of the claimed design.

DETAILED DESCRIPTION OF THE INVENTION

The present invention, preferred embodiments of the invention, and the accompanying drawing figures as described herein should not be construed as limited to the illustrated drawing. Rather the illustrated embodiment(s) are detailed to provide a thorough disclosure suitable to convey the scope of the invention to those skilled in the art. For the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

Figure 1:
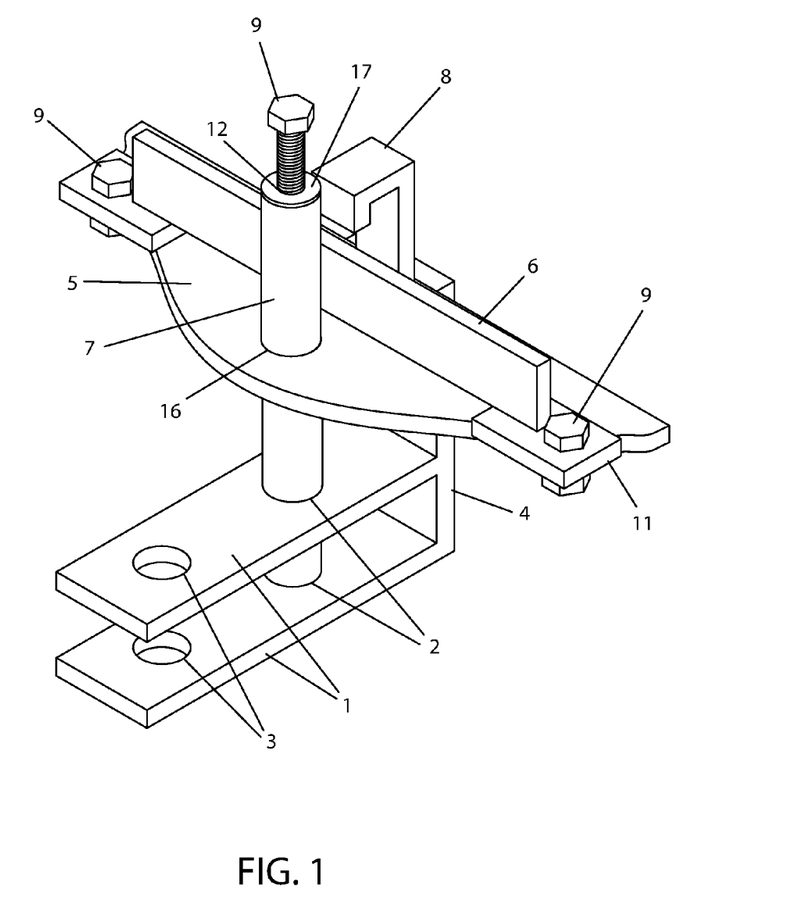
FIG. 1 is a perspective view of an improved drop hitch apparatus.
Figure 2:
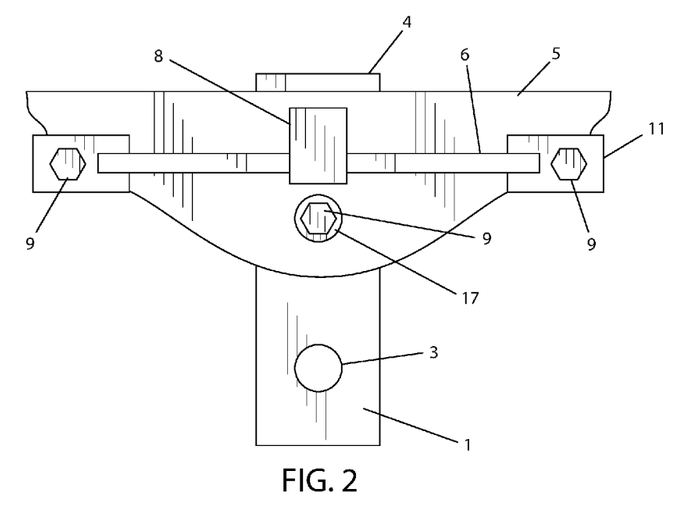
FIG. 2 is a top plan view of FIG. 1 thereof.
Figure 3:
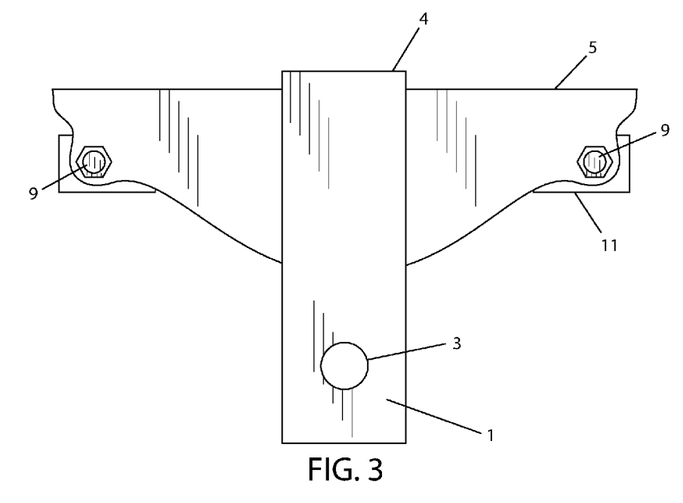
FIG. 3 is a bottom plan view of FIG. 1 thereof.
Figure 4:
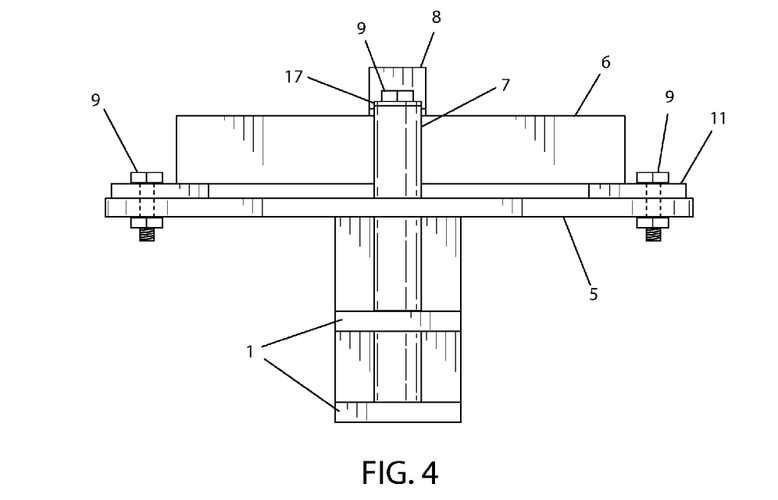
FIG. 4 is a front elevation view of FIG. 1 thereof.
Figure 5:
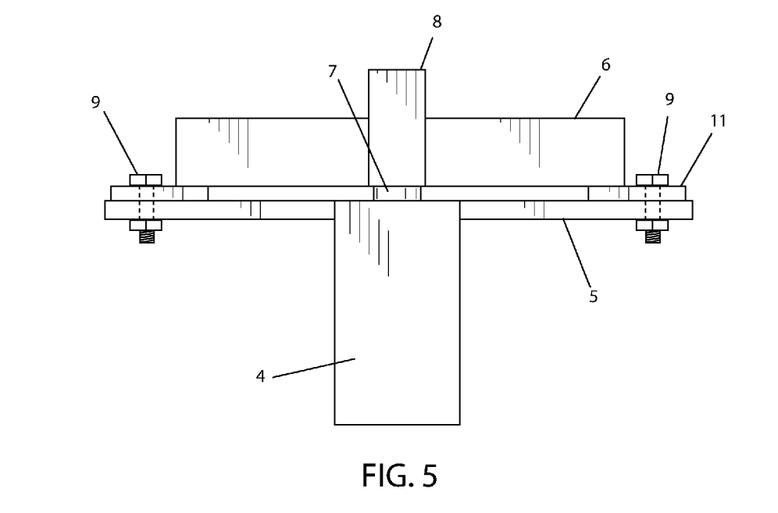
FIG. 5 is a rear elevation view of FIG. 1 thereof.
Figure 6:
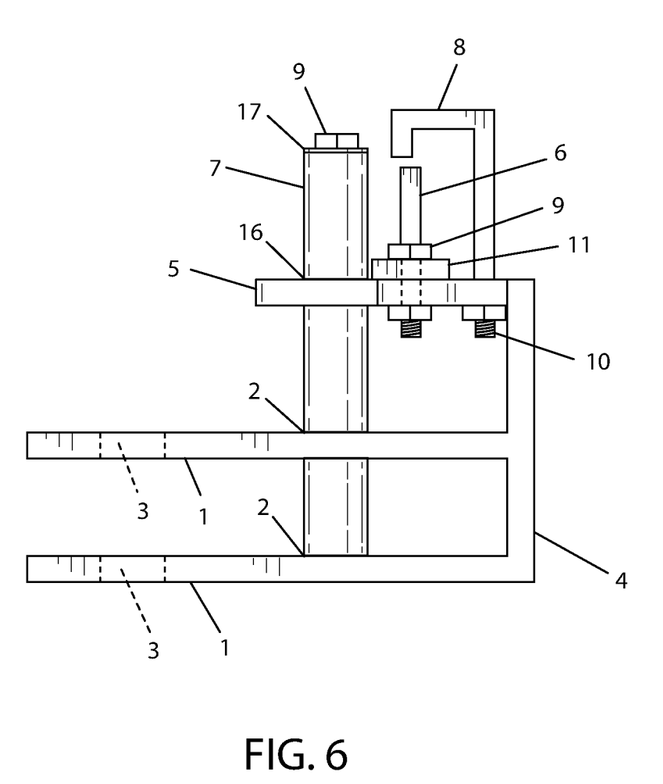
FIG. 6 is a left side elevation view of FIG. 1 thereof, the right side elevation view being a mirror image.
Figure 7:
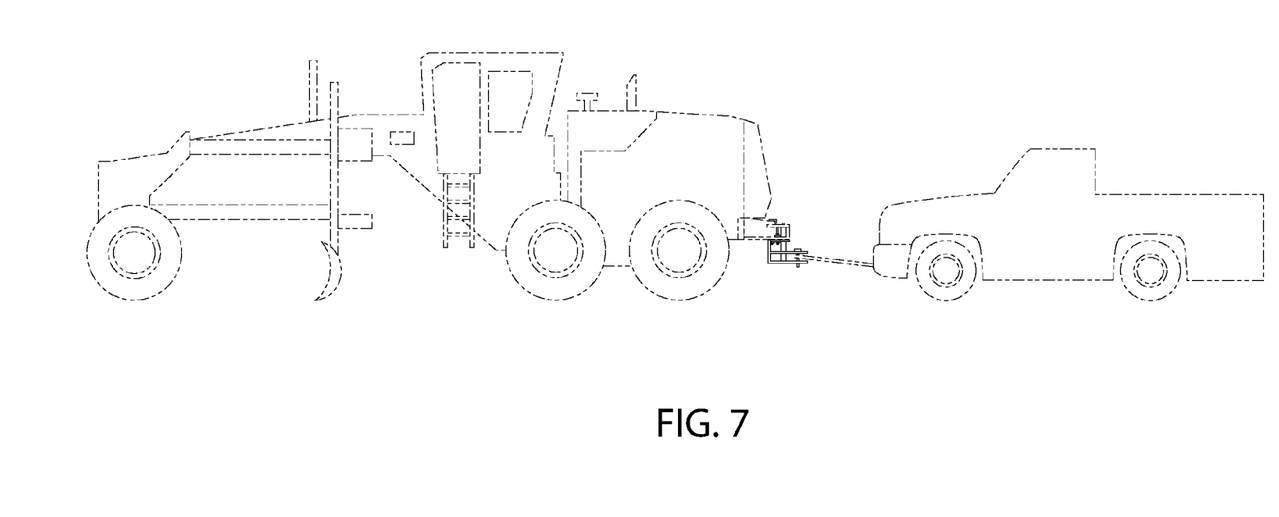
FIG. 7 is another side elevation view of FIG. 1 thereof, showing the drop hitch apparatus in use.

Referring more particularly to the drawing by characters of reference, FIGS. 1 and 7 depict an improved drop hitch apparatus and method for using the same for coupling a trailer to a towing vehicle when at least a portion of a hitch assembly for the trailer is substantially below the corresponding portion of a hitch assembly of the towing vehicle. The drop hitch apparatus cooperates with many existing hitch assemblies and is used as a height adjustment adapter to prevent tilting, raising, or lowering the trailer when coupling the trailer to the towing vehicle.

In an embodiment, the invention is a drop hitch apparatus comprising (including or having) at least one hitch plate for removably coupling to the hitch assembly of the trailer, a mounting assembly for removably mounting to at least a portion of a hitch assembly of a towing vehicle; and a support assembly for supporting the apparatus when coupled to the hitch assembly of the towing vehicle and the trailer hitch assembly. The mounting assembly is supported by the support assembly and the towing vehicle. The hitch plate may be connected to or otherwise extends outwardly from the support assembly.

In another embodiment, the drop hitch apparatus has at least one hitch plate; a mounting assembly that is removably mountable to at least a portion of a hitch assembly of a towing vehicle; and a support assembly for supporting the hitch plate and the mounting assembly. Here, the mounting assembly has a mounting shelf, a mounting bar, and a stability member. The stability member is fastenable to the mounting shelf to further secure the towing vehicle hitch assembly to the mounting assembly. The support assembly has an upstanding shaft member that extends upwardly from the hitch plate and the mounting shelf. The shaft member is removably insertable through at least a portion of the towing vehicle hitch assembly and is fastenable onto the towing vehicle hitch assembly.

In yet another embodiment, the drop hitch apparatus comprises: (a) two hitch plates 1, with one of the hitch plates 1 being arranged above the other hitch plate 1 and with each of the hitch plates 1 defining a first bore 3 for receiving a locking mechanism from a portion of a hitch assembly of a trailer, and a rearward second bore 2: (b) a support assembly having an upstanding support plate 4 and a tubular shaft member 7, with the shaft member 7 affixed inside the two second bores 2 of the two hitch plates 1 wherein each of these bores 2 circumscribe or encircle the shaft member 7, and with the rear end of at least one of the hitch plates 1 being affixed to and abutting the support plate 4; and (c) a mounting assembly having a mounting shelf 5 supported by the support plate 4 and the shaft member 7, a mounting bar 6, and a bracket or hook fastener 8.

The parts of the apparatus may be made from ½ inch thick flat metal. However, the parts of the apparatus can be made from thicker or heavier metal in situations where using ½ inch flat metal apparatus may not be strong enough to pull the trailer if the trailer gets stuck.

As shown in FIG. 1, the hitch plate 1 is essentially an elongated plate defining at least one bore therethrough, but preferably defining at least two bores 2, 3 therethrough. The two bores are a forward first bore 3 and a rear second bore 2. Preferably, two hitch plates are used, with the hitch plates being arranged above each other and spaced apart from each other. Therefore, the first bore and the second bore of the first hitch plate are aligned over the corresponding bores of the second hitch plate. As shown in FIG. 7, the forward first bore on each of the hitch plates receives a locking mechanism that secures the apparatus to the trailer's hitch assembly, namely, the trailer hitch member. The shaft member extends upwardly or vertically from the second bore of at least one of the hitch plates. Preferably, the rear second bore 2 of each of the hitch plates 1 receives the shaft member 7 therethrough. Each of the bores may be configured as any shape and size suitable for receiving the trailer locking means and the shaft member, respectively. Preferably, the rear bore is substantially circular and corresponds to the shape and size of the shaft member. Each bore is essentially cut into the hitch plate. The locking mechanism for securing the trailer hitch assembly to the hitch plates is essentially a locking pin.

In the preferred embodiment shown in the figures, the rear end of each hitch plate 1 is affixed to, mounted to, or otherwise abuts the upstanding support plate 4, and may be separate from the support plate. Alternatively, the hitch plates and the support plate are a single unitary member, with the rear end of the hitch plates extending outwardly from the support plate. In yet another embodiment (not shown), the rear end of only the lower hitch plate is affixed to or is otherwise permanently mounted to the upstanding support plate, while the rear end of the upper hitch plate is freestanding and supported by only the shaft member. Preferably, each hitch plate is approximately 4 inch wide and ½ inch thick.

The hitch plates connect the apparatus to the hitching assembly of the trailer, and also provide stability when towing the trailer. The hitch plates act as a drop hitch height adjustment adapter for trailers that have a hitch member lower than that of the hitch member of the towing vehicle. The size and placement of the hitch plates also allow the trailer to have more separation and spacing from the towing vehicle. The portion of the trailer hitch assembly, for example, a hitch receiver or trailer tongue is aligned between the upper first hitch plate and the lower second hitch plate and the respective forward first bores, then a locking means is inserted through the first bores and secured. A grader tractor hitch assembly or a ball mount hitch are an examples of a towing vehicle having an existing hitch assembly that can be coupled to the apparatus' hitch plates.

The support assembly includes a support plate 4 and a shaft member 7. The support plate supports the rearward part of the mounting assembly and the shaft member supports the forward part of the mounting assembly. More particularly, the support plate 4 supports the hitch plates 1 and the mounting assembly. The support plate is preferably a ½ inch thick, 4 inch wide piece of flat metal; however, the support plate may have any suitable dimension, shape or configuration. As shown in the figures, the lower portion of the support plate is affixed to the end of the lower hitch plate. The connection between the support plate and the lower hitch plate may be substantially ninety degrees, as shown in the figures, or at an angle. When the support plate and at least the lower hitch plate are made from a single piece of flat metal, the lower hitch plate is bent into the appropriate configuration.

Figure 8:
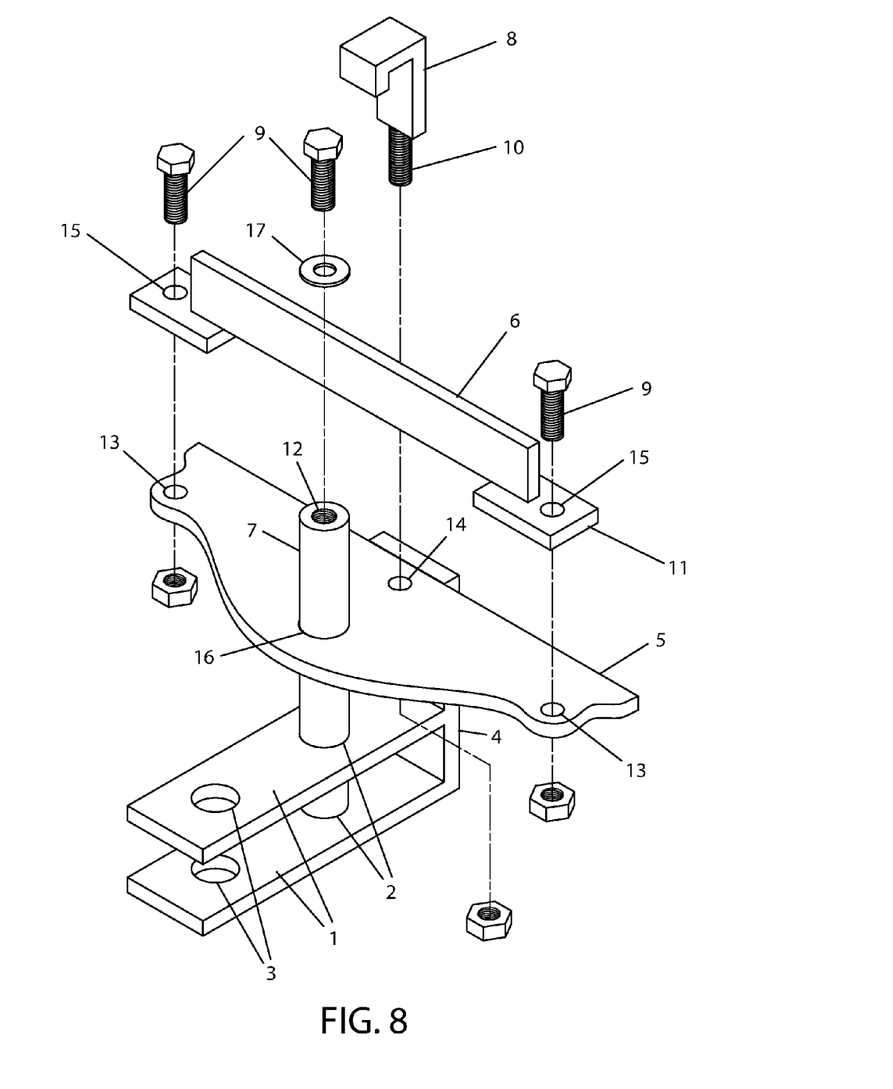
FIG. 8 is another perspective view of FIG. 1 thereof, showing the components disassembled.
Figure 9:
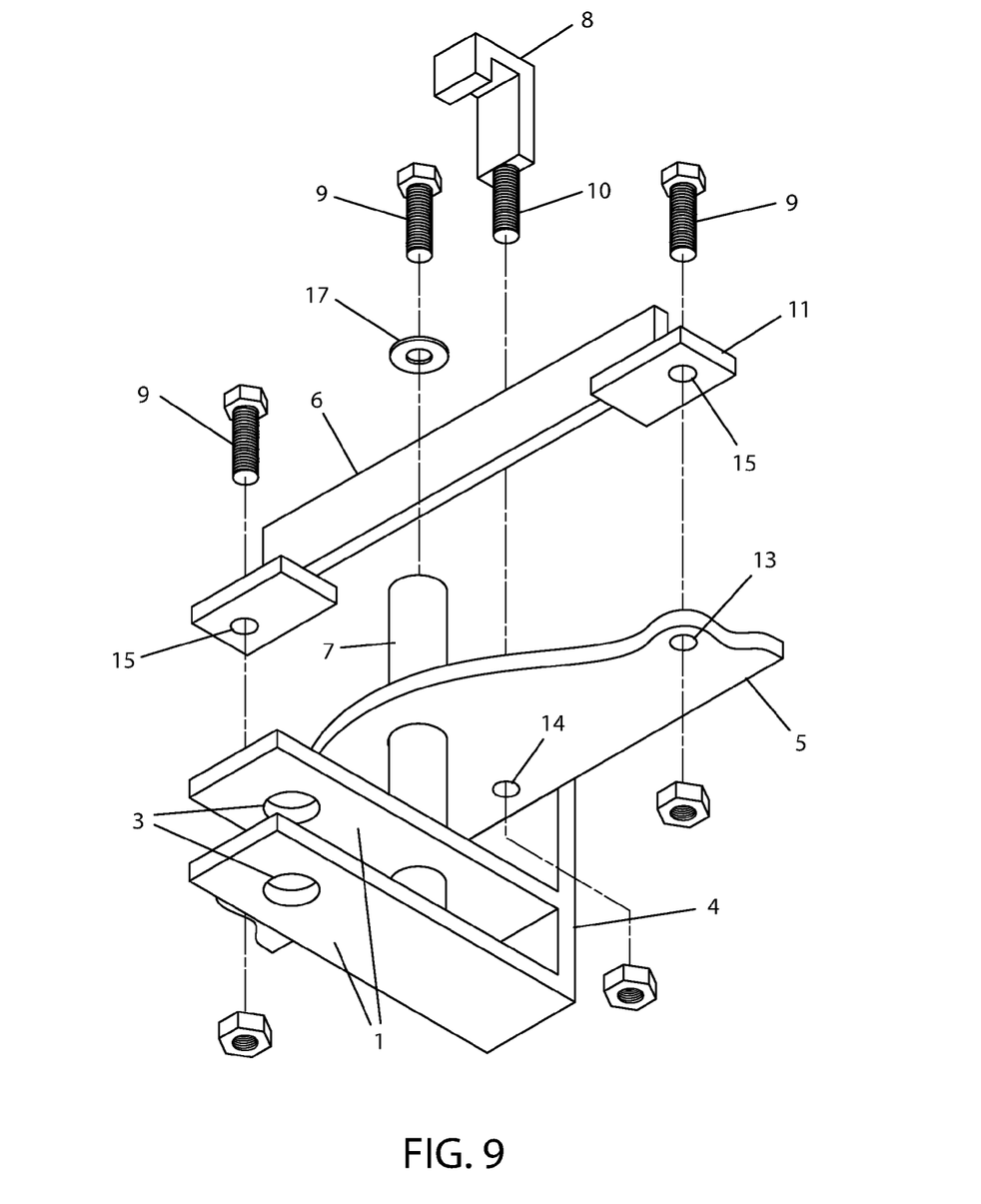
FIG. 9 is bottom view of FIG. 8 thereof, showing the components disassembled.

The shaft member 7 is substantially an elongated tubular shaft that has a top defining a threaded opening 12 for receiving a fastener 9. As shown in FIGS. 7 and 8, the shaft member 7 is upstanding within the rearward second bores 2 of the hitch plates 1 and through the forward bore 16 defined in the mounting shelf 5. The shaft member extends upwardly above the mounting shelf. The upper portion of the shaft member is insertable through the openings or bores in the existing hitch member of the towing member. Once installed, the shaft member and the mounting assembly prevent or at least decrease movement of the apparatus on the towing vehicle during the towing event. The shaft member may be permanently affixed to or mounted within the bores of the hitch plates and the mounting shelf. In one embodiment, the shaft member preferably is a 1¾ inch diameter cold roll tubular member. The shaft member fastener 9 includes at least one washer 17 and a threaded bolt 9. Preferably two washers are used. The two washers are preferably welded together. When only one washer is used, it is formed or fabricated from a tiered circular piece of flat metal. When the two washers are used, the washers are stacked, with the upper washer being smaller than the lower washer. For example, a first washer is a ¾ inch flat washer and a second washer is ⅞$^{th}$ inch flat washer, with the smaller washer positioned and stacked above the larger washer. The washers form a tiered lip overhanging the shaft member, with the top of the smaller washer circumscribing the shaft member threaded opening. An externally threaded fastener, namely, a threaded hex head screw. When the shaft member fastener is secured, the shaft member assists in securing the apparatus to the towing vehicle.

The mounting assembly includes a mounting shelf 5, a mounting bar 6, and a bracket or hook fastener 8. The mounting assembly removably mounts to the towing vehicle's portion of its hitch assembly. The mounting shelf 5 is essentially an elongated shelf or brace that has a plurality of holes 13, 14, 16. Each hole 13, 14 receives one of a plurality of fasteners 9 therethrough. The shelf is positioned horizontally and abuts the upstanding support plate. The shelf may be positioned and mounted either in front of the uppermost part of the support plate, or on top of the support plate. One hole 13 is defined in each opposing end portion of the mounting shelf 5, one hole 16 is defined at the forward portion of the mounting shelf 5, and one hole 14 is defined at the rearward portion of the mounting shelf 5. In a preferred embodiment, the mounting shelf is a shelf having a pair of opposing wings and a contoured front. The forward hole is located at the front of the mounting shelf. The forward hole 16 is suspended above the hitch plates 1, with the forward hole 16 aligning with the rear bores 2 on the hitch plates 1 to receive the shaft member 7. The rearward hole 14 on the mounting shelf 5 receives the bracket fastener 10. In the preferred embodiment, each fastener is a ¾ inch, grade 8 standard threaded bolt. The mounting shelf fits underneath the original hitch member on the towing vehicle. The mounting shelf 5 abuts on, to, or underneath the towing vehicle's hitch assembly to removably mount the apparatus to the towing vehicle. The mounting shelf helps support the weight of the towing vehicle's hitch assembly.

As shown in the figures, the mounting bar 6 is a laterally upstanding bar having two opposing feet 11. A foot is mounted, welded, or otherwise affixed to the bottom of each end portion of the mounting bar. Each foot 11 has a hole 15 defined therethrough to receive a fastener 9. The mounting bar may be made from ½ inch thick flat metal that is 2 inches wide. The mounting bar is removable from the mounting shelf, as shown in FIG. 8. The mounting bar cooperates with the mounting shelf. Here, the mounting bar fits between the towing vehicle's existing hitch member and the mounting shelf fits underneath the towing vehicle's existing hitch member. The two side holes 13 receive fasteners 9 to secure the mounting bar to the mounting shelf, thereby sandwiching the existing trailer hitch assembly.

A bracket or hook member S with a fastener 10 that extends downwardly from the hook member further secures the mounting shelf 5 to the towing vehicle. The hook member is essentially an inverted J-shaped hook S having a threaded headless bolt 10. The bolt extends downwardly from the bottom of the J-hook for rotatably inserting through the rear hole of the mounting shell Preferably, the J-hook is made from ½ inch flat metal and is 2 inches wide. The fastener may be welded or otherwise permanently affixed to or within the J-hook. The J-hook is used as a hold-down bolt to keep the mounting shelf secured to the towing vehicle hitch assembly. More particularly, the "hook" of the J-hook essentially engages with and clamps over a portion of the towing vehicle hitch member.

To assemble the apparatus, flat metal is cut or crafted with a conventional tool into the desired shape, with the plurality of holes, bores, and openings drilled or otherwise routed into the flat metal parts. A headless threaded bolt is affixed to, at, or within the bottom portion of the J-hook. The appropriate sections of the flat metal parts may be welded or otherwise mounted together. This apparatus can be mounted onto a towing vehicle, for example road grader, with one 1⅛ inch combination wrench in only a few minutes.

As shown in FIG. 7, the drop hitch apparatus can be installed on a towing vehicle, for example a grader that has a spaced apart hitch member with at least one bore. The shaft member fastener, the mounting bar fasteners, the mounting bar, and the J-hook fastener are separated from the mounting shelf. The mounting bar is installed between the towing vehicle's spaced apart hitch member. The shaft member is aligned and inserted upwardly into and through the towing vehicle's bore until the mounting shelf abuts underneath the towing vehicle's hitch member. The shaft member fastener is rotatably inserted through the shaft member hole and tightened to hold the apparatus in place on the towing vehicle. The mounting fasteners are rotatably inserted through the side holes of the mounting bar and tightened. The J-hook fastener is rotatably inserted though the rear hole in the mounting shelf. Therefore, the apparatus is coupled to and secured to the existing towing vehicle vertically at the front with the shaft member fastener and at the rear with the J-hook fastener, and laterally with the side mounting fasteners of the mounting shelf and mounting bar.

To install the drop hitch apparatus to a trailer hitch member, for example, a trailer tongue having a bore, is inserted between the two hitch plates of the apparatus. A locking pin or other locking mechanism, including, but not limited to, a pull pin, a tow pin or other comparable pin, is inserted through the forward bores of the two hitch plates and secured. As shown in FIG. 7, if the trailer's hitch member is substantially lower than the towing vehicle's hitch member, the apparatus' hitch plates are lower than the mounting shelf to receive the trailer's hitch member. This placement of the hitch plates prevents the trailer from tilting.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. A drop hitch apparatus comprising:
   a. a first hitch plate and a second hitch plate, with each of the hitch plates for coupling to at least one portion of a hitch assembly of a trailer, wherein the first hitch plate having a first bore for receiving a locking mechanism from the at least one portion of the trailer hitch assembly, and wherein the second hitch plate having a first bore for receiving the locking mechanism from the at least one portion of the trailer hitch assembly, with each of the hitch plates being spaced apart and arranged above each other;
   b. a mounting assembly comprising a mounting shelf and a stability member fastenable to the mounting shelf with the mounting assembly coupling to at least one portion of a towing vehicle hitch assembly; and
   c. a support assembly for supporting the hitch plate and the mounting assembly, the support assembly comprising an upstanding shaft member coupling to the at least one portion of the towing vehicle hitch assembly, wherein the at least one portion of the trailer hitch assembly is lower than the towing vehicle hitch assembly.

2. The drop hitch apparatus of claim 1, each of the first and second hitch plates further comprising a second bore, wherein the shaft member extends upwardly through the second bores of each of the first and second hitch plates.

3. The drop hitch apparatus of claim 1, the mounting shelf defining a plurality of holes with two of the holes located at opposing ends of the mounting shelf and one of the holes located at a rear of the mounting shelf, and a bore located at a front of the mounting shelf with the mounting shelf being removably mountable to the at least one portion of the towing vehicle hitch assembly.

4. The drop hitch apparatus of claim 3, the mounting assembly further comprising a mounting bar having two opposing feet, each foot defining a hole, each of the foot holes being alignable over the mounting shelf two side holes for receiving a fastener, with the mounting bar being engageable with the hitch assembly of the towing vehicle.

5. The drop hitch apparatus of claim 3, the stability member further comprising an inverted J-hook having threaded fastener extending therefrom for rotatably fastening through the rear hole in the mounting shelf, with the J-hook engaging with the at least one portion of the towing vehicle hitch assembly.

6. The drop hitch apparatus of claim 1, the support assembly further comprising an upstanding support plate for supporting a rear of the first and second hitch plates and for supporting the mounting shelf.

7. The drop hitch apparatus of claim 1, wherein the shaft member is tubular and defining a threaded opening at a top of the shaft member for receiving a threaded fastener, and a removable washer circumscribing the threaded opening, with the shaft member coupling to the at least one portion of the towing vehicle hitch assembly.

8. A drop hitch apparatus comprising:
   a. at least one hitch plate for coupling to at least one portion of a hitch assembly of a trailer;
   b. a mounting assembly comprising a mounting shelf, a mounting bar, and a stability member fastenable to the mounting shelf, the mounting assembly mountable to at least one portion of a towing vehicle hitch assembly; and
   c. a support assembly for supporting the hitch plate and the mounting assembly, the support assembly comprising an upstanding shaft member extending upwardly from the hitch plate and the mounting shelf, with the shaft member being insertable through at least one portion of the towing vehicle hitch assembly, wherein the at least one portion of the trailer hitch assembly is lower than the towing vehicle hitch assembly.

9. The drop hitch of claim 8, wherein the at least one hitch plate further comprising a second hitch plate, with each of the hitch plates having a first bore for receiving a locking mechanism from a trailer hitch assembly, with the hitch plates being spaced apart and arranged above each other.

10. The drop hitch apparatus of claim 9, each of the hitch plates further comprising a second bore, wherein the shaft member extends upwardly through the second bores of each of the hitch plates.

11. The drop hitch apparatus of claim 8, the mounting shelf defining a plurality of holes with two of the holes located at opposing ends of the mounting shelf and one of the holes located at a rear of the mounting shelf, and a bore located at a front of the mounting shelf, with the mounting shelf being removably mountable to the at least one portion of the towing vehicle hitch assembly.

12. The drop hitch apparatus of claim 11, the mounting bar further comprising a pair of opposing feet, each foot defining a hole, with the holes alignable over the mounting shelf two side holes for receiving a fastener, the mounting bar being positioned over or through the at least one portion of the towing vehicle hitch assembly and secured to the mounting shelf.

13. The drop hitch apparatus of claim 8, the stability member further comprising an inverted J-hook having threaded fastener extending therefrom for rotatably fastening through the rear hole in the mounting shelf, with the J-hook engaging with the at least one portion of the towing vehicle hitch assembly.

14. The drop hitch apparatus of claim 8, the support assembly further comprising an upstanding support plate supporting the at least one hitch plate and the mounting shelf.

15. The drop hitch apparatus of claim 8, the shaft member is tubular and defining a threaded opening at a top of the shaft member for receiving a threaded fastener, and a removable washer circumscribing the threaded opening, with the fastener fastenable onto the at least one portion of the towing vehicle hitch assembly and the shaft member opening.

16. A drop hitch apparatus for coupling to at least one portion of a hitch assembly of a towing vehicle to a trailer wherein the trailer has at least one portion of a hitch assembly lower than the towing vehicle's hitch assembly, the drop hitch apparatus comprising:
   a. two hitch plates, with one of the hitch plates arranged below the other hitch plate, each of the hitch plates defining a first bore for receiving a locking mechanism from the trailer hitch assembly;
   b. a mounting assembly having a mounting shelf defining a plurality of holes with two of the holes located at opposing ends of the mounting shelf and one of the holes located at a rear of the mounting shelf and a bore located at a front of the mounting shelf, with the mounting shelf being removably mountable to the at least one portion of the towing vehicle hitch assembly; a mounting bar having two opposing feet, each foot defining a hole, with the holes alignable over the mounting shelf two side holes for receiving a fastener for removably fastening to the mounting shelf with the mounting bar engageable with the towing vehicle hitch assembly; and an inverted J-hook having threaded fastener extending therefrom for rotatably fastening through the rear hole in the mounting shelf, with the J-hook engaging with the at least one portion of the towing vehicle hitch assembly; and
   c. a support assembly having an upstanding support plate supporting at least one of the hitch plates, and an upstanding shaft member supporting at least one of the two hitch plates, with the support plate and the shaft member each supporting the mounting shelf and with the shaft member insertable through the at least one portion of the towing vehicle hitch assembly.

17. The drop hitch apparatus of claim 16, each of the hitch plates further comprising a second bore, wherein the shaft member is affixed therein.

18. The drop hitch apparatus of claim 16, wherein the shaft member is tubular and defining a threaded opening at a top of the shaft member for receiving a threaded fastener, and a removable washer circumscribing the shaft member.

\* \* \* \* \*